(12) United States Patent
Cooley et al.

(10) Patent No.: US 9,214,709 B2
(45) Date of Patent: Dec. 15, 2015

(54) BATTERY-CAPACITOR HYBRID ENERGY STORAGE SYSTEM FOR HIGH TEMPERATURE APPLICATIONS

(75) Inventors: John J. Cooley, Boston, MA (US); Riccardo Signorelli, Boston, MA (US)

(73) Assignee: CastCAP Systems Corporation, Bosto, MA (US)

( * ) Notice: Subject to any disclaimer, the term of this patent is extended or adjusted under 35 U.S.C. 154(b) by 1148 days.

(21) Appl. No.: 12/928,897

(22) Filed: Dec. 21, 2010

(65) Prior Publication Data
US 2012/0156528 A1 Jun. 21, 2012

(51) Int. Cl.
*H01M 16/00* (2006.01)
*H01G 11/40* (2013.01)

(52) U.S. Cl.
CPC ........... *H01M 16/00* (2013.01); *H01G 11/40* (2013.01); *H01M 16/006* (2013.01); *Y02E 60/13* (2013.01)

(58) Field of Classification Search
CPC ............................ H01M 16/00; H01M 16/006
USPC ..................................... 429/9, 179
See application file for complete search history.

(56) References Cited

U.S. PATENT DOCUMENTS

| | | | |
|---|---|---|---|
| 4,408,259 A | 10/1983 | Muranaka et al. | |
| 5,440,447 A | 8/1995 | Shipman et al. | |
| 5,711,988 A | 1/1998 | Tsai et al. | |
| 6,059,847 A | 5/2000 | Farahmandi et al. | |
| 6,193,779 B1 | 2/2001 | Reichert et al. | |
| 6,205,016 B1 | 3/2001 | Niu | |
| 6,232,706 B1 | 5/2001 | Dai et al. | |
| 6,304,427 B1 | 10/2001 | Reed et al. | |
| 6,388,423 B1 | 5/2002 | Schilleci, Jr. | |
| 6,454,816 B1 | 9/2002 | Lee et al. | |
| 6,491,848 B1 | 12/2002 | Sato et al. | |
| 6,565,701 B1 | 5/2003 | Jerabek et al. | |
| 6,665,169 B2 | 12/2003 | Tennent et al. | |
| 6,906,911 B2 | 6/2005 | Ikeda et al. | |
| 7,126,207 B2 | 10/2006 | Mosley et al. | |
| 7,201,627 B2 | 4/2007 | Ohnuma | |

(Continued)

FOREIGN PATENT DOCUMENTS

| | | |
|---|---|---|
| JP | 2003133185 A | 5/2003 |
| WO | WO9966985 A | 12/1999 |
| WO | WO2008016990 A2 | 2/2008 |

OTHER PUBLICATIONS

International Search Report from PCT/US2007/068314, mailed Feb. 13, 2008.

(Continued)

*Primary Examiner* — Cynthia H Kelly
*Assistant Examiner* — Monique Wills
(74) *Attorney, Agent, or Firm* — Wolf Greenfield & Sacks, P.C.

(57) ABSTRACT

A hybrid energy storage system (ESS) includes a first energy storage device including a battery having an impedance for providing a substantially constant power output, and a second energy storage device linked to the first energy storage and including a high power electrochemical double layer capacitor (EDLC) for providing intermittent bursts of high voltage output in a range of 1.5 to 3.0 volts, wherein an operation rating of the second energy source is within a temperature range between 75 degrees Celsius and 330 degrees Celsius while exhibiting a leakage current less than 1 amp per liter of volume over the range of operating temperatures and at a voltage up to a rated voltage.

16 Claims, 2 Drawing Sheets

(56) References Cited

U.S. PATENT DOCUMENTS

| | | | |
|---|---|---|---|
| 7,335,395 | B2 | 2/2008 | Ward et al. |
| 7,381,367 | B1 | 6/2008 | Baker et al. |
| 7,511,941 | B1 | 3/2009 | Gallay et al. |
| 7,699,102 | B2 | 4/2010 | Storm et al. |
| 7,785,558 | B2 | 8/2010 | Hikata |
| 7,982,439 | B2 | 7/2011 | Trainor et al. |
| 8,168,331 | B2 | 5/2012 | Best et al. |
| 2002/0177018 | A1 | 11/2002 | Fuglevand |
| 2003/0003359 | A1* | 1/2003 | Banno et al. ............. 429/189 |
| 2003/0030969 | A1 | 2/2003 | Farahmandi et al. |
| 2003/0081372 | A1 | 5/2003 | Kashara et al. |
| 2004/0131937 | A1 | 7/2004 | Chen et al. |
| 2004/0188350 | A1 | 9/2004 | Beste et al. |
| 2004/0229117 | A1 | 11/2004 | Mitani et al. |
| 2005/0152096 | A1 | 7/2005 | Farahmandi et al. |
| 2005/0208207 | A1 | 9/2005 | Hinoki et al. |
| 2005/0230270 | A1 | 10/2005 | Ren et al. |
| 2005/0231893 | A1 | 10/2005 | Harvey et al. |
| 2005/0234177 | A1 | 10/2005 | Zaghib et al. |
| 2006/0191681 | A1 | 8/2006 | Storm et al. |
| 2006/0194102 | A1 | 8/2006 | Keshishian et al. |
| 2006/0256506 | A1 | 11/2006 | Konuma et al. |
| 2006/0279906 | A1 | 12/2006 | Stemen et al. |
| 2007/0015336 | A1 | 1/2007 | Farahmandi et al. |
| 2007/0076349 | A1 | 4/2007 | Dementiev et al. |
| 2007/0097598 | A1 | 5/2007 | Siggel et al. |
| 2007/0146965 | A1 | 6/2007 | Mitchell et al. |
| 2007/0188977 | A1 | 8/2007 | Takeda et al. |
| 2007/0254213 | A1 | 11/2007 | Best et al. |
| 2007/0258192 | A1 | 11/2007 | Schindall et al. |
| 2007/0258193 | A1 | 11/2007 | Zhong et al. |
| 2007/0259216 | A1 | 11/2007 | Logan |
| 2007/0292746 | A1 | 12/2007 | Sloop |
| 2008/0013224 | A1 | 1/2008 | Kim et al. |
| 2008/0068801 | A1 | 3/2008 | Wilk et al. |
| 2008/0083626 | A1 | 4/2008 | Kubo et al. |
| 2008/0094777 | A1 | 4/2008 | Itahashi et al. |
| 2008/0192407 | A1 | 8/2008 | Lu et al. |
| 2008/0316678 | A1 | 12/2008 | Ehrenberg et al. |
| 2009/0011330 | A1* | 1/2009 | Onodera et al. ............. 429/179 |
| 2009/0021890 | A1 | 1/2009 | Bourcier et al. |
| 2009/0250409 | A1 | 10/2009 | Fiene et al. |
| 2009/0272935 | A1 | 11/2009 | Hata et al. |
| 2009/0272946 | A1 | 11/2009 | Lu et al. |
| 2009/0303658 | A1 | 12/2009 | Hiroyuki et al. |
| 2010/0026518 | A1* | 2/2010 | Kirst et al. |
| 2010/0046142 | A1 | 2/2010 | Aitchison et al. |
| 2010/0119934 | A1* | 5/2010 | Ushio et al. ............. 429/163 |
| 2010/0134955 | A1 | 6/2010 | O'Connor et al. |
| 2010/0196600 | A1 | 8/2010 | Shibuya et al. |
| 2011/0080689 | A1 | 4/2011 | Bielawski et al. |
| 2011/0085285 | A1 | 4/2011 | Zednizek et al. |
| 2011/0141661 | A1 | 6/2011 | Muthu et al. |
| 2011/0150736 | A1 | 6/2011 | Hagiwara et al. |
| 2011/0151317 | A1 | 6/2011 | Giroud et al. |
| 2011/0170236 | A1 | 7/2011 | Young |

OTHER PUBLICATIONS

Written Opinion of the International Searching Authority from PCT/US2007/068314, mailed Feb. 13, 2008.
International Search Report from PCT/US2012/039342, mailed Dec. 6, 2012.
Written Opinion of the International Searching Authority from PCT/US2012/039342, mailed Dec. 6, 2012.
International Search Report from PCT/US2012/041438, mailed Nov. 19, 2012.
Written Opinion of the International Searching Authority from PCT/US2012/041438, mailed Nov. 19, 2012.
International Search Report from PCT/US2012/045994, mailed Dec. 26, 2012.
Written Opinion of the International Searching Authority from PCT/US2012/045994, mailed Dec. 26, 2012.
International Search Report from PCT/US2012/047474, mailed Oct. 16, 2012.
Written Opinion of the International Searching Authority from PCT/US2012/047474, mailed Oct. 16, 2012.
International Search Report from PCT/US2013/027697, mailed Jun. 26, 2013.
An, et al., "Supercapacitors Using Single-Walled Carbon Nanotube Electrodes", Advanced Materials, Apr. 2001, pp. 497-500, vol. 13, No. 7.
Emmenegger, et al., "Investigation of Electrochemical Double-layer (ECDL) Capacitors Electrodes Based on Carbon Nanotubes and Activated Carbon Materials," J. of Power Sources, 2003, pp. 321-329, vol. 124.
Halber, "Researchers Fired Up Over New Battery", The Tech, Feb. 8, 2006, pp. 1, 5, vol. 50, No. 16.
Hensley, et al., "The evolution of oilfield batteries", Oilfield Review, Autumn 1998, pp. 42-57.
Hyeok, et al., "Electrochemical Properties of High-Power Supercapacitors Using Single-Walled Carbon Nanotube Electrodes," Adv. Funct. Mater., Oct. 2001, 387-392, vol. 11, No. 5.
Koch, "Electrochemical Double Layer Capacitors for High Temperature Applications," 14th International Seminar on Double Layer Capacitors and Hybrid Energy Storage Devices, Dec. 6-8, 2004, pp. 33-39.
Koch, "Thermally Robust Capacitors for the Drilling Industry," Report for U.S. Dept. of Energy Grant No. DE-FG02-06ER84598 for the period Jun. 28, 2006 to Mar. 27, 2007.
Marincic, "High Temperature Electrochemical Double Layer Capacitors with Reduced Leakage Rate," 14th International Seminar on Double Layer Capacitors and Hybrid Energy Storage Devices, Dec. 6-8, 2004, pp. 310-316.
Niu, et al., "High Power Electrochemical Capacitors Based on Carbon Nanotube Electrodes," Appl. Phys. Lett., Mar. 17, 1997, pp. 1480-1482, vol. 70, No. 11.
Robertson, "Realistic applications of CNTs," materialstoday, Oct. 2004, pp. 46-52, vol. 7, No. 10.
Signorelli, et al., "Nanotube Enhanced Ultracapacitor," 14th International Seminar on Double Layer Capacitors and Hybrid Energy Storage Devices, Dec. 6-8, 2004, pp. 49-61.
Signorelli, et al., "Nanotube Enhanced Ultracapacitor," 15th International Seminar on Double Layer Capacitors and Hybrid Energy Storage Devices, Dec. 5-7, 2005, pp. 158-168.
Signorelli, et al., "High Density Energy Storage Using a Nanotube-Enhanced Ultracapacitor," 16th International Seminar on Double Layer Capacitors and Hybrid Energy Storage Devices, Dec. 4-6, 2006, pp. 15-21.
Signorelli, et al., "Fabrication and Electrochemical Testing of the First Generation Carbon-Nanotube Based Ultracapacitor Cell," 17th International Seminar on Double Layer Capacitors and Hybrid Energy Storage Devices, Dec. 10-12, 2007, pp. 70-78.
Signorelli, et al., "High Potential Vertically Aligned Carbon Nanotubes as EDLC Electrodes," 18th International Seminar on Double Layer Capacitors and Hybrid Energy Storage Devices, Dec. 8-10, 2008, pp. 73-79.
Signorelli, et al., "Carbon Nanotube Enhanced Ultracapacitor", Sep. 2004.
Zuckerbrod, et al., "How Dry I Am: Optimizing Cell Performance Through Proper Component Drying," 15th International Seminar on Double Layer Capacitors and Hybrid Energy Storage Devices, Dec. 5-7, 2005, pp. 101-110.
Awad, et al., "Thermal degradation studies of alkyl-imidazolium salts and their application in nanocomposites," Thermochimica Acta, pp. 3-11, 2004, vol. 409.
Balducci, et al., "High temperature carbon—carbon supercapacitor using ionic liquid as electrolyte," J. Power Sources, pp. 922-927, Jan. 3, 2007, vol. 165.
Liu, et al., "Graphene-Based Supercapacitor with an Ultrahigh Energy Density," Nano Lett., pp. 4863-4868, 2010, vol. 10.
Maxwell Technologies Application Note, "Maxwell Technologies' Test Procedures for Capacitance, ESR, Leakage Current and Self-Discharge Characterizations of Ultracapacitors," Jul. 2009, pp. 1-10.
Ngo, et al., "Thermal properties of imidazolium ionic liquids," Thermochimica Acta, pp. 97-102, 2000, vol. 357-58.

(56) References Cited

OTHER PUBLICATIONS

Nishida, et al., "Physical and electrochemical properties of 1-alkyl-3-methylimidazolium tetrafluoroborate for electrolyte," J. Fluorine Chem., pp. 135-141, 2003, vol. 120.

Randstrom, "The influence of air and its components on the cathodic stability of N-butyl-N-methylpyrrolidinium bis (trifluoromethanesulfonyl)imide," Electrochimica Acta, pp. 1837-1842, Aug. 19, 2007, vol. 53.

Shamsipur, et al., "Physical and electrochemical properties of ionic liquids 1-ethyl-3-methylimidazolium tetrafluoroborate, 1-butyl-3-methylimidazolium trifluoromethanesulfonate and 1-butyl-1-methylpyrrolidinium bis (trifluoromethylsulfonyl)imide," J. Mol. Liq., pp. 43-50, Aug. 24, 2010, vol. 157.

Ue, et al., "Application of Low-Viscosity Ionic Liquid to the Electrolyte of Double-Layer Capacitors," J. Electrochem. Soc., Feb. 28, 2003, pp. A499-A502, vol. 150, No. 4.

Notice of Allowability dated Feb. 19, 2014, U.S. Appl. No. 12/928,896.

Supplemental Notice of Allowability dated May 1, 2014, U.S. Appl. No. 12/928,896.

\* cited by examiner

BATTERY-CAPACITOR HYBRID ENERGY STORAGE SYSTEM FOR HIGH TEMPERATURE APPLICATIONS

BACKGROUND OF THE INVENTION

The invention generally relates to electrochemical double-layer capacitors, and more specifically to a battery-capacitor hybrid energy storage system for high temperature applications.

A battery-only energy storage system (BESS) is typically designed to meet certain required specifications in total energy capacity, power handling capability and physical size and weight. The selection of suitable battery technologies becomes increasingly limited as the required power handling capability increases. This problem is exacerbated as the required operating temperatures increase.

Conventional solutions utilize so-called high-rate lithium cells. In applications requiring high power or pulsed power, conventional solutions may require a BESS that is significantly oversized with respect to total energy capacity in order to meet the requirement in power handling capability. Additionally, an overall safety of the energy storage system may be improved if a high-rate lithium cell is not needed.

Accordingly, what is desired is an energy source which is capable of providing a suitable combination of total energy capacity, power handling capability per unit weight and volume and that operates at high temperature without the need for a high-rate lithium cell.

SUMMARY OF THE INVENTION

The present invention discloses a battery-capacitor hybrid energy storage system (HESS) for high temperature applications.

In general, in one aspect, the invention features an HESS including a first energy storage device including a battery having an impedance for providing a substantially constant power output, and a second energy storage device linked to the first energy storage and including a high power electrochemical double layer capacitor (EDLC) for providing intermittent bursts of high power output in a range of 1.5 to 3.5 volts, wherein an operation rating of the second energy source is within a temperature range between 75 degrees Celsius and 330 degrees Celsius while exhibiting a leakage current less than 1 amp per liter of volume over the range of operating temperatures and at a voltage up to 3.5 volts.

Other features and advantages of the invention are apparent from the following description, and from the claims.

BRIEF DESCRIPTION OF THE DRAWINGS

The invention will be more fully understood by reference to the detailed description, in conjunction with the following figures, wherein.

Like reference numbers and designations in the various drawings indicate like elements.

DETAILED DESCRIPTION

Figure 1:
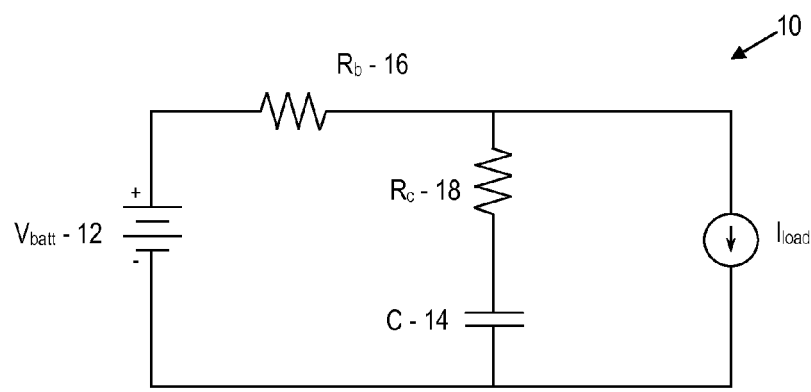
FIG. 1 is a block diagram.

As shown in FIG. 1, an exemplary circuit diagram of a battery-ultracapacitor hybrid energy storage system (HESS) 10 includes a first energy source 12 having a high energy density, and a high capacity, but which may not be able to provide high power as required by certain applications. The first energy source 12 may thus be one or more battery cells, examples of which include, but are not limited to, a lead-acid battery, a nickel-cadmium battery, a nickel-metal hydride battery, a lithium ion battery, a lithium polymer battery, a lithium ion polymer electrolyte battery, a zinc air battery, and combinations thereof. The battery cell or cells may also be a primary battery, such as a conventional alkaline battery or even a compact portable fuel cell. The battery cell or cells may be disposed in a battery pack.

The battery-ultracapacitor HESS 10 includes a second energy source 14 connected electrically in parallel to the first energy source 12. The second energy source 14 is capable of delivering a burst of high power, as may be required by a particular application. As such, the second energy source 14 is preferably an electrochemical double layer capacitor (EDLC).

At high application temperatures, parasitic leakage current levels are generally elevated. In parallel combinations, energy sources share leakage currents, so, for instance, an elevated leakage current in the EDLC could in theory drain the stored energy from the primary energy source at a prohibitive rate when exposed to high application temperatures. As such, the second energy source 14 is preferably an EDLC designed specifically to exhibit low-leakage current at nominal working voltages when exposed to high application temperatures (a High-temperature EDLC).

The battery-ultracapacitor HESS 10 includes first and second resistors 16 and 18 to provide a measure of the impedance to the first energy source 12 and second energy source 14, respectively. In should be noted that these resistors 16, 18 are circuit model elements that represent an non-ideal battery and capacitor output impedances, not actual resistors that are added to the system 10.

Figure 2:
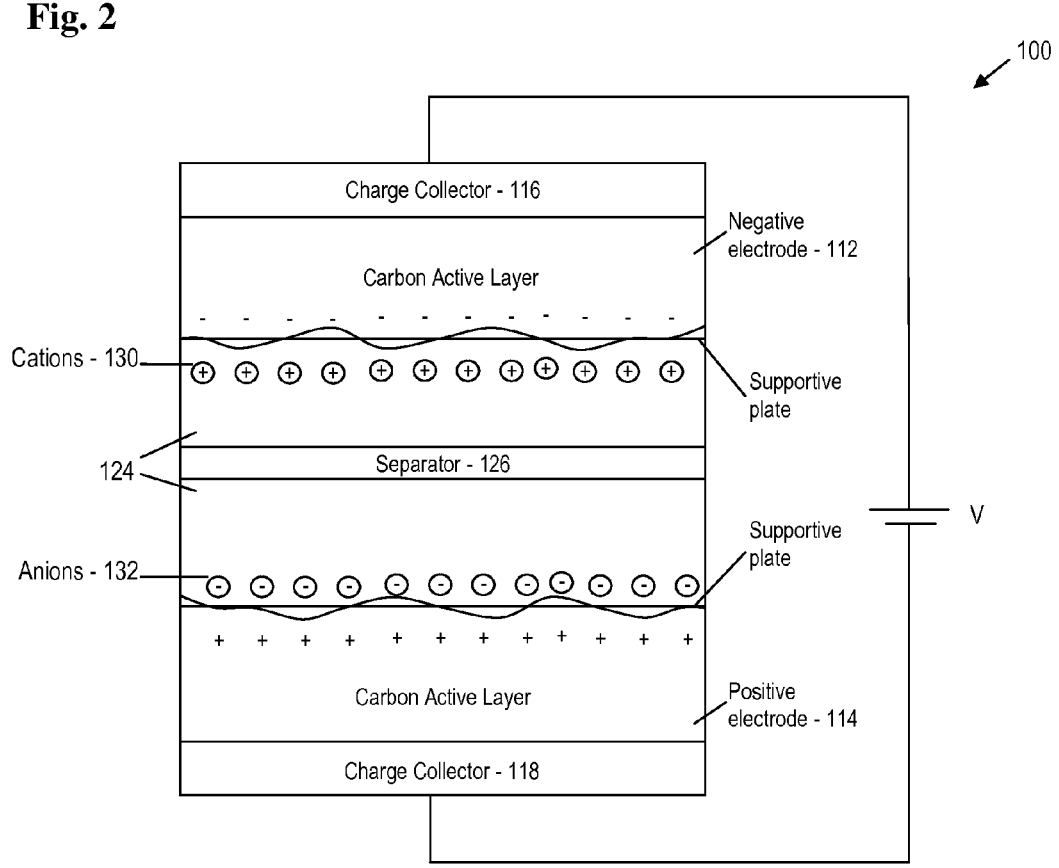
FIG. 2 is a block diagram.

As shown in FIG. 2, in a specific example, the HESS 10 includes an electrochemical double layer capacitor (EDLC) 100. The EDLC 10 includes two electrodes 112, 114, each with a double layer of charge at an electrolyte interface, supported on conductive metal plates 116, 118. The electrodes 112, 114 are two of the electrically conducting parts of the EDLC 100.

When the HESS 10 incorporating a high-temperature EDLC replaces a battery-only energy storage system (BESS), the power handling requirements of the battery in that HESS are reduced. As such, the HESS 10 having equivalent performance in power handling capability and energy capacity to a high-rate lithium BESS can include a low-rate rather than a high-rate lithium battery. An overall safety of the HESS 10 is increased when an HESS having a low rate lithium battery replaces a high-rate lithium BESS In addition, the HESS 10 incorporating a low-rate lithium battery and having equivalent performance in power handling capability and energy capacity exhibits lower volume and weight compared to a high-rate lithium BESS.

The EDLC 100 includes charge collectors 120, 122, respectively, an electrolyte 124 and a separator 126. In general, the electrolyte 124 is a chemical compound (salt) that disassociates into electrically charged ions. A solvent that that dissolves the ions might be present. The resulting electrolytic solution is an ionic liquid that conducts electricity by ionic transport.

The exemplary EDLC 100 is either of a wound or prismatic form which is packaged into a cylindrical or prismatic enclosing body. The enclosing body is hermetically sealed. In one example, the package is hermetically sealed by laser, ultrasonic, or other types of welding.

In general, the separator 126 is a thin structural material (usually a sheet) used to separate the electrodes 112, 114, of a divided electrochemical cell into two or more compartments. The electrolyte 124 occupies pores in the electrodes 112, 114 and separator 126.

In the EDLC 100, the electrodes 112, 114 can be provided by and include activated carbon, carbon fibers, rayon, graphene, aerogel, carbon cloth, and/or carbon nanotubes. Activated carbon electrodes can be manufactured, for example, by producing a carbon base material by carrying out a first activation treatment to a carbon material obtained by carbonization of a carbon compound, producing a formed body by adding a binder to the carbon base material, carbonizing the formed body, and finally producing an active carbon electrode by carrying out a second activation treatment to the carbonized formed body. Others methods may also be used.

Carbon fiber electrodes can be produced, for example, by using paper or cloth preform with high surface area carbon fibers. Other methods may be used.

In one specific example, multiwall carbon nanotubes (MWNT) on a variety of substrates using chemical vapor deposition (CVD) are fabricated for use in the electrodes 112, 114 of EDLC 100. In a preferred embodiment, low-pressure chemical vapor deposition (LPCVD) is used. The fabrication process uses a gas mixture of acetylene, argon, and hydrogen, and an iron catalyst deposited on the substrate using electron beam deposition and or sputtering deposition.

The electrolyte 124 includes a pairing of a cation 130 and an anion 132 and may include a solvent. Various combinations of each are used. In the exemplary EDLC 100, the cation 130 can include 1-(3-Cyanopropyl)-3-methylimidazolium, 1,2-Dimethyl-3-propylimidazolium, 1,3-Bis(3-cyanopropyl) imidazolium, 1,3-Diethoxyimidazolium, 1-Butyl-1-methylpiperidinium, 1-Butyl-2,3-dimethylimidazolium, 1-Butyl-3-methylimidazolium, 1-Butyl-4-methylpyridinium, 1-Butylpyridinium, 1-Decyl-3-methylimidazolium, 1-Ethyl-3-methylimidazolium, 3-Methyl-1-propylpyridinium, and combinations thereof.

In the EDLC 100, the anion 132 can include bis(trifluoromethanesulfonate)imide, tris(trifluoromethanesulfonate) methide, dicyanamide, tetrafluoroborate, hexafluorophosphate, trifluoromethanesulfonate, bis(pentafluoroethanesulfonate)imide, thiocyanate, trifluoro (trifluoromethyl)borate, and combinations thereof.

The solvent can be Acetonitrile, Amides, Benzonitrile, Butyrolactone, Cyclic Ether, Dibutyl carbonate, Diethyl carbonate, Diethylether, Dimethoxyethane, Dimethyl carbonate, Dimethylformamide, Dimethylsulfone, Dioxane, Dioxolane, Ethyl formate, Ethylene carbonate, Ethylmethyl carbonate, Lactone, Linear Ether, Methyl formate, Methyl propionate, Methyltetrahydrofuran, Nitrile, Nitrobenzene, Nitromethane, N-methylpyrrolidone, Propylene carbonate, Sulfolane, Sulfone, Tetrahydrofuran, Tetramethylene sulfone, Thiophene, Ethylene glycol, Diethylene glycol, Triethylene glycol, Polyethylene glycols, Carbonic acid ester, γ-Butyrolactone, Nitrile, Tricyanohexane, or any combination thereof.

The separator 126 can be fabricated from non-woven glass. The separator 126 can also be fabricated from fiberglass, flouro-polymers, Telfon®, PTFE, and ceramics. For example, using non-woven glass, the separator 126 can include main fibers and binder fibers each having a fiber diameter smaller than that of each of the main fibers and allowing the main fibers to be bonded together.

Once the EDLC 100 is fabricated, it may be used in high temperature applications with little or no leakage current. The EDLC 100 described herein can operate efficiently at temperatures from −20 C. to 300 C. with leakage currents normalized over the volume of the device less than 1 amp per liter (A/L) of volume of the device within the entire operating voltage and temperature range. One key to this performance at −20 C. to 300 C. with leakage currents less than 1 A/L is the assembly process itself, which produces a finished EDLC 100 having a moisture concentration in the electrolyte of less than 500 parts per million (ppm) over the weight and volume of the electrolyte and an amount of impurities less than 1000 ppm.

More specifically, the activated carbon, carbon fibers, rayon, carbon cloth, and/or nanotubes making up the two electrodes 112, 114, is dried at an elevated temperature in a vacuum environment. The separator 126 may be dried at elevated temperature in a vacuum environment. The electrolyte 124 may be dried at elevated temperature in a vacuum environment. Once the electrodes 112, 114, the separator 126, and electrolyte 124 are dried under vacuum, they are packaged without a final seal or cap in an atmosphere with less than 50 parts per million (ppm) of water. The uncapped EDLC 100 may be dried under vacuum over a temperature range of about 100 C to about 300 C. Once this final drying is complete, the EDLC 100 may be sealed in an atmosphere with less than 50 ppm of moisture.

In addition, impurities, such as halide ions (chloride, bromide, fluoride, iodide), free amines (ammonia), sulfate, metal cations (Ag, Al, Ba, Br, Ca, Cd, Co, Cr, Cu, Fe, K, Li, Mg, Mn, Mo, Na, Ni, Pb, Sr, Ti, Zn), and so forth, are kept to below 1000 ppm. Further, impurities from solvents and precursors used in the synthesis process are kept below 1000 ppm and can include, for example, bromoethane, chloroethane, 1-bromobutane, 1-chlorobutane, 1-methylimidazole, ethyl acetate, methylene chloride and so forth.

By reducing the moisture content in the EDLC 100 to less than 500 part per million (ppm) over the weight and volume of the electrolyte and the impurities to less than 1,000 ppm, the EDLC 100 can efficiently operate over a temperature range of −20 C. to 300 C. with a leakage current less than 1 Amp per Liter within the temperature and voltage range.

Figure 3:
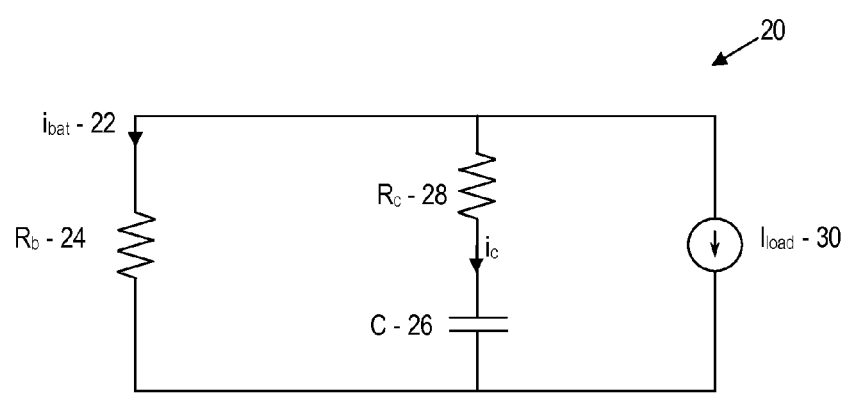
FIG. 3 is a block diagram.

As shown in FIG. 3, a small signal circuit diagram 20, which is equivalent to the circuit in FIG. 1, includes a battery current ($i_{bat}$) 22, a first resistor ($R_b$) 24, a capacitor (C) 26, a second resistor ($R_c$) 28, a capacitor current ($i_c$) 30 and a load current ($i_{load}$) 32. Analysis of the circuit diagram 20 leads to the following transfer functions between the small-signal load current ($i_{load}$) 32, the battery current ($i_{bat}$) 22 and capacitor current ($i_c$) 30:

$$i_b/i_{load} = (R_c sC+1)/(sC(R_c+R_b)+1)$$

$$i_c/i_{load} = R_b sC/(sC(R_c+R_b)+1)$$

Given a desired operation of the ESS 10, the system parameters are constrained as follows:

$$R_c/(R_b+R_c) \leq (I_{b,max}-I_{b,DC})/I_{load,max}$$

$$1/CR_c \leq \omega_p$$

wherein the DC component of the battery current $I_{b,DC}$ equals a time-averaged load current $i_{load}$ and $\omega_p$ is the frequency component of the load current.

High-Rate Lithium BESS Example

Using an Electrochem Industries high-rate cell MWD150 3B3900 DD-size:

Temperature range: 0° C. to 150° C.

Cell weight: 220 grams (g)

Cell volume: $(1/2)*(32.6 mm^2)*\pi*127.5 m*1e-6 = 106$ ml

Open ckt. Voltage voc=3.67 V
Capacity=24 Ah
$i_{max}$=500 mA
To achieve $V_w$=40 V, what is needed is 40/3.67=11 cells in parallel
6*11=66 cells leading to a capacity of 66*24=1,584 Ah
BESS weight=66*220 g=14.5 kg
BESS volume=66*106 ml=7 liters (l)

High Temperature EDLC and Low-Rate Lithium Battery Hess Example
Temperature range: 0° C. to 150° C.
Cell weight: 95 g
Cell volume: (1/2)*(24.6 mm²)*π*101.6 m*1e−6=48 ml
Open ckt. Voltage voc=3.67 V
Capacity=12 Ah
$i_{max}$=500 mA
$ESR_b$=1.5Ω
To achieve $V_w$=40 V what is needed is 11 cells in series. To achieve capacity greater than or equal to 350 Ah requires three such strings in parallel
3*11=33 cells leading to $I_{max}$=3*68 mA and 33*12 mAh=396 mAh capacity
Battery weight: 33*95 g=3.1 kg
Battery volume: 33*48 ml=1.6 liter
In a D-size example:
Temperature range: 0° C. to 330° C.
Cell weight: 84 g
Cell volume: 56 ml
Open ckt. Voltage voc=2 V
Capacity: 12 Ah
$i_{max}$=4.3 A
$ESR_c$=14 mΩ
Capacitance: 141 F
Leakage current: less than 1 amp per liter of volume over the range of operating temperatures and at a voltage a rated voltage
To achieve $V_w$=40 V, 20 cells in series are needed. To check the design constrains it is given:

$$R_b=11/3*ESR_b=5\Omega$$

$$R_c=20*14\ m\Omega=280\ m\Omega$$

$$I_{b,max}=3*68\ mA=204\ mA$$

$$C=1/20*141\ F=7\ F$$

$$i_{load,max}=3A$$

$$i_{b,DC}=0.01*3A=30\ mA$$

$$(i_{b,max}-i_{b,DC})/I_{load,max}=0.058\ \text{and}\ (R_C+R_B)=0.053\ \text{satisfy}\ R_c/(R_b+R_c)\leq(I_{b,max}-I_{b,DC})/I_{load,max}.$$

$$\Omega_p=1.24\ \text{rps and}\ 1/CR_c=0.45\ \text{satisfies}\ 1/CR_c\leq\omega_p$$

The capacitor string discharges the battery at a rate of 3 mA/396 mAh=0.7%/hour.
EDLC weight=20*84 g=1.68 kg
EDLC volume=20*56 ml=1.12 liters
HESS weight=3.1 kg+1.68 kg=4.8 kg

CONCLUSION

The HESS 10 effectively buffers 3 A pulses every 5 seconds without discharging the battery more than 1% per hour. Further, the HESS 10 achieves lower weight and volume compared to the BESS while incorporating a low-rate rather than a high-rate primary.

It is to be understood that the foregoing description is intended to illustrate and not to limit the scope of the invention, which is defined by the scope of the appended claims. Other embodiments are within the scope of the following claims.

What is claimed is:

1. A hybrid energy storage system (HESS) comprising:
a first energy storage device including a battery configured to provide a substantially constant power output; and
a second energy storage device linked to the first energy storage and including a high power electrochemical double layer capacitor (EDLC) for providing intermittent bursts of high power output over the range of 1.5 to 3.5 volts, wherein an operation rating of the second energy source is within a temperature range between 75 degrees Celsius and 330 degrees Celsius while exhibiting a leakage current less than 1 amp per liter of volume over the range of operating temperatures and at a voltage up to 3.5 volts;
wherein the HESS provides lower weight and volume than a battery energy storage system (BESS) that is capable of providing comparable bursts of high power output,
wherein the EDLC comprises two electrodes wetted with an electrolyte, each electrode being attached to or in contact with or coated onto a current collector and separated from each other by a separator porous to the electrolyte,
wherein the electrodes, electrolyte, and current collector contain less than 1,000 parts per million (ppm) of impurities, and
wherein the electrodes, electrolyte, and separator have a moisture concentration of less than 1,000 ppm.

2. The HESS of claim 1 wherein the battery is selected from the group consisting of lead-acid batteries, nickel cadmium batteries, nickel metal hydride batteries, lithium ion batteries, lithium polymer batteries, and combinations thereof.

3. The HESS of claim 1, wherein each electrode comprises materials selected from the group consisting of carbon fibers, rayon, activated carbon, aerogel, graphene, carbon cloth, carbon nanotubes, or combinations thereof.

4. The HESS of claim 1, wherein the separator comprises materials selected from the group consisting of non-woven glass, cellulosic material, polytetrafluoroethylene (PTFE), fiberglass, fluoropolymers, ceramics, or combinations thereof.

5. The HESS of claim 1, wherein the electrolyte comprises a cation and an anion.

6. The HESS of claim 5 wherein the cation electrolyte is selected from the group consisting of 1-(3-Cyanopropyl)-3-methylimidazolium, 1,2-Dimethyl-3-propylimidazolium, 1,3-Bis(3-cyanopropyl)imidazolium, 1,3-Diethoxyimidazolium, 1-Butyl-1-methylpiperidinium, 1-Butyl-2,3-dimethylimidazolium, 1-Butyl-3-methylimidazolium, 1-Butyl-4-methylpyridinium, 1-Butylpyridinium, 1-Decyl-3-methylimidazolium, 1-Ethyl-3-methylimidazolium, 3-Methyl-1-propylpyridinium, and combinations thereof.

7. The HESS of claim 5 wherein the anion electrolyte is selected from the group consisting of bis(trifluoromethanesulfonate)imide, tris(trifluoromethanesulfonate)methide, dicyanamide, tetrafluoroborate, hexafluorophosphate, trifluoromethanesulfonate, bis(pentafluoroethanesulfonate)imide, thiocyanate, trifluoro(trifluoromethyl)borate, and combinations thereof.

8. The HESS of claim 1, wherein the electrolyte comprises a cation, an anion and a solvent.

9. The HESS of claim 8 wherein the solvent is Acetonitrile, Amides, Benzonitrile, Butyrolactone, Cyclic Ether, Dibutyl carbonate, Diethyl carbonate, Diethylether, Dimethoxyethane, Dimethyl carbonate, Dimethylformamide, Dimethylsulfone, Dioxane, Dioxolane, Ethyl formate, Ethylene carbonate, Ethylmethyl carbonate, Lactone, Linear Ether, Methyl formate, Methyl propionate, Methyltetrahydrofuran, Nitrile, Nitrobenzene, Nitromethane, N-methylpyrrolidone, Propylene carbonate, Sulfolane, Sulfone, Tetrahydrofuran, Tetramethylene sulfone, Thiophene, Ethylene glycol, Diethylene glycol, Triethylene glycol, Polyethylene glycols, Carbonic acid ester, γ-Butyrolactone, Nitrile, Tricyanohexane, or combinations thereof.

10. The HESS of claim 1, wherein the impurities include halide ions (chloride, bromide, fluoride, iodide), free amines (ammonia), sulfate, metal cations (Ag, Al, Ba, Br, Ca, Cd, Co, Cr, Cu, Fe, K, Li, Mg, Mn, Mo, Na, Ni, Pb, Sr, Ti, Zn), bromoethane, chloroethane, 1-bromobutane, 1-chlorobutane, 1-methylimidazole, ethyl acetate, methylene chloride, or combinations thereof.

11. The HESS of claim 1, wherein the first energy storage device comprises lithium and the ELDC substantially free of lithium.

12. The HESS of claim 1, wherein a moisture concentration of the electrolyte is less than 500 parts per million (ppm) over the weight or volume of the electrolyte.

13. The HESS of claim 1, wherein each of the electrolyte, electrodes, separator, and current collector have been dried n an atmosphere with less than 50 parts per million (ppm) of water during assembly of the ELDC.

14. The HESS of claim 1, wherein the electrolyte comprises an ionic liquid.

15. The HESS of claim 1, wherein the EDLC is contained in a hermetically sealed housing.

16. A hybrid energy storage system (HESS) comprising:
a first energy storage device including a battery configured to provide a substantially constant power output; and
a second energy storage device linked to the first energy storage and including a high power electrochemical double layer capacitor (EDLC) for providing intermittent bursts of high power output over the range of 1.5 to 3.5 volts, wherein an operation rating of the second energy source is within a temperature range between 75 degrees Celsius and 330 degrees Celsius while exhibiting a leakage current less than 1 amp per liter of volume over the range of operating temperatures and at a voltage up to 3.5 volts;
wherein the first energy storage device is characterized by an energy density and capacity higher than that of the second energy storage device;
wherein the intermittent bursts of high power output by the second energy storage device are at a power higher than the constant power output of the first energy storage device;
wherein the EDLC comprises two electrodes wetted with an electrolyte, each electrode being attached to or in contact with or coated onto a current collector and separated from each other by a separator porous to the electrolyte,
wherein the electrodes, electrolyte, and current collector contain less than 1,000 parts per million (ppm) of impurities, and
wherein the electrodes, electrolyte, and separator have a moisture concentration of less than 1,000 ppm.

* * * * *